(12) United States Patent
Yoo

(10) Patent No.: US 9,031,623 B2
(45) Date of Patent: May 12, 2015

(54) CELLULAR PHONE CASE

(71) Applicant: Chang Seob Yoo, Seoul (KR)

(72) Inventor: Chang Seob Yoo, Seoul (KR)

( * ) Notice: Subject to any disclaimer, the term of this patent is extended or adjusted under 35 U.S.C. 154(b) by 0 days.

(21) Appl. No.: 13/973,808

(22) Filed: Aug. 22, 2013

(65) Prior Publication Data

US 2014/0057687 A1 Feb. 27, 2014

(30) Foreign Application Priority Data

Aug. 22, 2012 (KR) .......................... 10-2012-0092042
Dec. 11, 2012 (KR) .......................... 10-2012-0144017

(51) Int. Cl.
*H04B 1/38* (2006.01)

(52) U.S. Cl.
CPC .................................... *H04B 1/3888* (2013.01)

(58) Field of Classification Search
CPC . H04B 1/3888; H04M 1/0235; H04M 1/0237
USPC ............... 455/575.1, 575.4, 575.8, 90.3, 347,
455/344, 66.1; 361/679.3, 679.39
See application file for complete search history.

(56) References Cited

U.S. PATENT DOCUMENTS

| 4,342,350 A * | 8/1982 | Resnick ........................ 150/138 |
| 7,983,725 B2 * | 7/2011 | Zhang et al. ................ 455/575.4 |
| 2007/0060220 A1 * | 3/2007 | Hsu ............................. 455/575.4 |

FOREIGN PATENT DOCUMENTS

| KR | 20-0385469 Y1 | 5/2005 |
| KR | 20-0419357 Y1 | 6/2006 |
| KR | 10-0996722 B1 | 11/2010 |
| KR | 10-2011-0083512 A | 7/2011 |

* cited by examiner

*Primary Examiner* — Tuan Pham
(74) *Attorney, Agent, or Firm* — KORUS Patent, LLC; Seong Il Jeong

(57) ABSTRACT

The present invention relates to a protective case for cellular phones. By letting the cellular phone be closely fixed by a cellular phone supporting fixture elastically fixed with springs and plate springs attached to a protection cover when holding the cellular phone, in order to be capable of accommodating and fixing a wide range of cellular phones which slightly differ in size, thickness, model and etc. between cellular phone supporting fixture and plate spring, and by pulling out a moving board where the cellular phone is kept upward a fixed board when taking photographs with the cellular phone, users are able to take photographs in the condition in which a camera lens of the cellular phone is exposed outside the cellular phone case. Diverse types and functions of wallet receptacles can be combined on the face outside the main body of the cellular phone case.

4 Claims, 11 Drawing Sheets

CELLULAR PHONE CASE

FIELD OF THE INVENTION

The present invention relates to a protective case for cellular phones, and more particularly, to a case for cellular phones of various sizes with a sufficient wallet functions, by combining a wallet with a cellular phone case equipped with a means for stably accommodating a wide range of cellular phones of differing in size, thickness, and type.

DESCRIPTION OF THE RELATED ART

Korean Patent Publication No. 10-2012-0067260 relates to a cellular phone case which can receive the transportation cards. The cellular phone case covers and protects the rear face of a cellular phone as well as envelops and incorporates the side face of the cellular phone, includes a transportation fixing part which forms on the inner face of the case and closely fixes the transportation cards between the inner face of the case and the rear face of the cellular phone, and enables the transportation cards to be included inside the cellular phone case so that the user can keep the transportation cards and the credit cards very easily, which improves the convenience substantially.

In addition, Korean Utility Model Registration No. 20-0457433 relates to a wallet and cellular phone case. The cellular phone case, which envelops and incorporates the rear face of a cellular phone, protects the cellular phone from external impact to carry out the function of a cellular phone case, as well as to carry out the function of a wallet through a pocket supporting part which forms a pocket foldably incorporated to the main part of the case, and through a supporting structure of fixed flap and pocket supporting part, the wallet and cellular phone case carries out the function of a holder which supports the main body of the case and its incorporated cellular phone in a certain angle.

BACKGROUND OF THE INVENTION

In the past where a cellular phone functioned mainly as a portable phone, people would hold both a cellular phone and a wallet containing transportation cards, credit cards and money. Recently, however, as the function and use of cellular phones has increased significantly, people tend to always hold cellular phones.

For this reason, people are widely using cellular phone cases that contain a few transportation cards or credit cards and a small amount of money by forming a predetermined receptacle on the face inside the cover of the cellular phone case in which the cellular phone is inserted.

However, because such current cellular phone cases that hold the cellular phone on the face inside the main body of the cellular phone case, where a camera lens hole is formed, allow the user to take photographs through a lens hole in the cellular phone case by exposing the camera lens of the cellular phone when taking photographs, they cannot continuously combine receptacles and others of a wallet on the face outside main body of the cellular phone case where a camera lens hole is formed. Therefore, they can restrictively combine a simple receptacle in which a few transportation cards or credit cards or a small amount of money on the face inside the main body of the cellular phone case, and such wallet type cellular phone cases are not capable of providing as diverse a function as a wallet.

In addition, with today's rapid development in information and communications technology as well as advanced technologies related to cellular phones, products equipped with unique functions for each type of cellular phone are being released with slightly different sizes, thicknesses and types.

Accordingly, different cellular phone protective cases are being manufactured to suit the size, thickness and type of each cellular phone for being supplied to consumers.

Therefore, the manufacturers and sellers of cellular phone cases have the burden of preparing all cellular phone cases to fit to a number of cellular phone types. Every time new cellular phones are released, these case manufacturers must dispose of mold parts and inventory goods for existing cellular phone cases, and prepare mold parts and inventory goods to fit the newly released cellular phones, which in turn raises the manufacturing cost and becomes a factor burdening manufacturers, sellers and consumers.

In addition, consumers who use cellular phones are also disadvantaged by having to examine cellular phone cases one by one to ensure they fit the cellular phone type they possess when purchasing cellular phone cases.

SUMMARY OF INVENTION

This invention is investigated in consideration of the various problems with existing cellular phone protective cases described above, and a purpose of this invention is to provide users a cellular phone case capable of performing the functions of a wallet as well as the functions of a case with the cellular phone case alone, by enabling the cellular phone protective case to be endowed with diverse functions as a wallet.

Another purpose of this invention is to provide a cellular phone case equipped with a means for stably accommodating a wide range of cellular phone types with slight differences in size, thickness and type.

In order to achieve the above objects, one embodiment of the present invention provides and is characterized by containing the followings;

a cellular phone supporting fixture of an upper and lower cellular phone supporting member, which is installed in an opposed manner between supporting board and protection cover, and moves upward and downward, and in a left and right direction by sliding as an elastically fixed condition with a spring, by letting the cellular phone be held between plate springs of the protection cover on the front face of the supporting board where the upper and lower cellular phone supporting member was assembled phone be closely fixed by the cellular phone supporting fixture elastically fixed with springs and plate springs attached to protection cover when holding the cellular phone, in order to be capable of accommodating and fixing a wide range of cellular phones which slightly differ in size, thickness, model and etc. between cellular phone supporting fixture and plate spring, by installing a fixed board where a case guide rail is formed, and a moving board which moves upward and downward along with the guide rail on the face inside the main body of cellular phone and where the cellular phone is kept, when taking photographs with the cellular phone, by pulling out upward the fixed board where the cellular phone is kept, the user is enabled to take photographs in the condition in which the camera lens of cellular phone is exposed outside the cellular phone case, by sufficiently providing diverse types and functions of wallet receptacles on the face outside the main body of cellular phone case, carrying out the function of a cellular phone case as well as the function of a wallet at the same time only with the cellular phone case, by letting the cellular phone be closely fixed by the cellular phone supporting fixture elastically fixed with springs and plate springs attached to protection cover when holding the cellular phone, in order to be capable of accommodating and fixing a wide range of cellular phones which slightly differ in size, thickness, model and etc. between cellular phone supporting fixture and plate spring, and when taking photographs with the cellular phone, the user is enabled to take photographs in the condition in which the camera lens of cellular phone is exposed outside the cellular phone case, by sufficiently providing diverse types and functions of wallet or diary receptacles on the face outside the main body of cellular phone case, the cellular phone case of the present invention has the effect of carrying out the function of a cellular phone case as well as the function of a wallet at the same time with only the cellular phone case.

DETAILED DESCRIPTION OF THE INVENTION

Hereinafter, the desired embodiments of the present invention are described in detail with reference to attached drawings.

Figure 1:
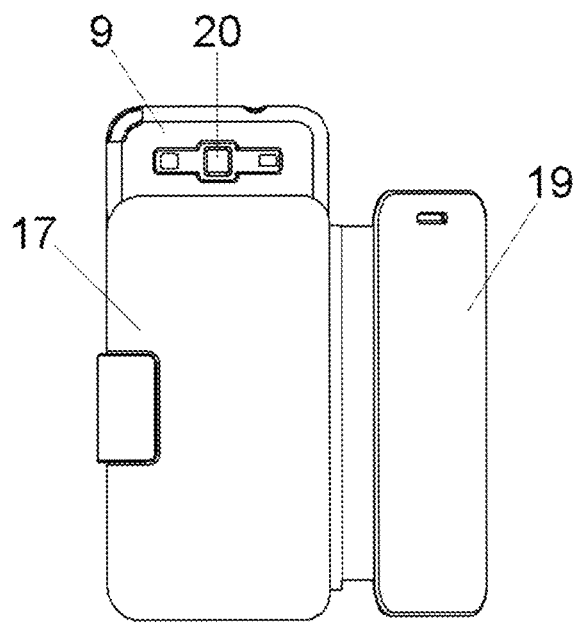
FIG. 1 is an outline perspective view of an embodiment of the cellular phone case according to the present invention.
Figure 2:
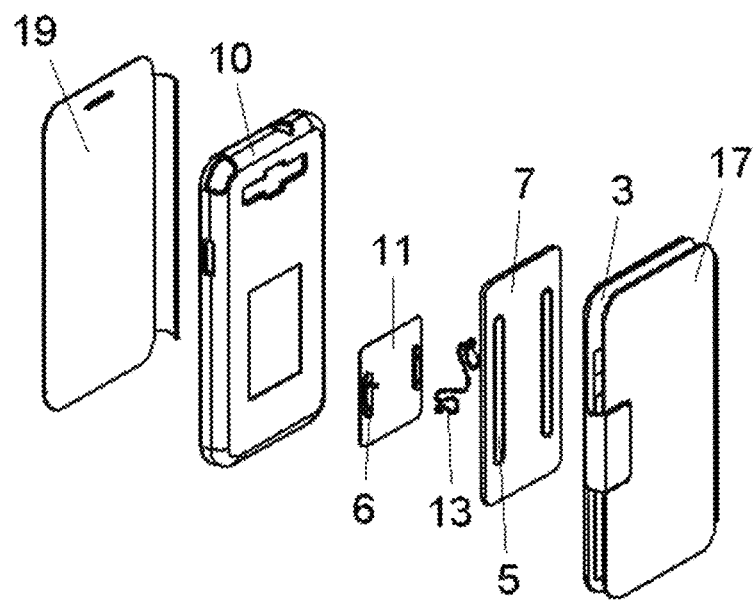
FIG. 2 is an exploded perspective view of the same embodiment in FIG. 1, FIG. 3 and FIG. 4 are partial front views which show how the invention works.

FIG. 1 is an outline perspective view of an embodiment of the cellular phone case according to the present invention, and FIG. 2 is an exploded perspective view of the same embodiment in FIG. 1.

The cellular phone case of an embodiment of the prevent invention as shown in FIG. 1 and FIG. 2 is characterized by containing;

a plastic fixed board 7 which forms as an integral part or forms independently to be combined to the main body 3, and where a guide rail 5 forms on the face inside the cellular phone case, a plastic moving board 11 installed on the face inside the fixed board 7, where a guider 6 moves upward and downward along with the guide rail 5, and on the inside face of which a cellular phone 9 or a cellular phone supporting board 10 is installed, and a spring 13 of which one side end is fixed on the center line of left end part of the fixed board 7, and of which the other side end is fixed on the centerline of right end part of the moving board 11, respectively.

Again, the cellular phone supporting board 10 is manufactured of several methods including hard plastic or jelly type flexible plastic or Velcro tape or two sides tape so as to hold a cellular phone 9. And, on the face outside the main body 3, a plurality of wallet and diary receptacles 17 with diverse types and functions are combined. Unexplained symbol 19 is a screen protection cover which is connected to one side of main body 3 to be combined, and unexplained symbol 20 is a camera lens.

Figure 3:
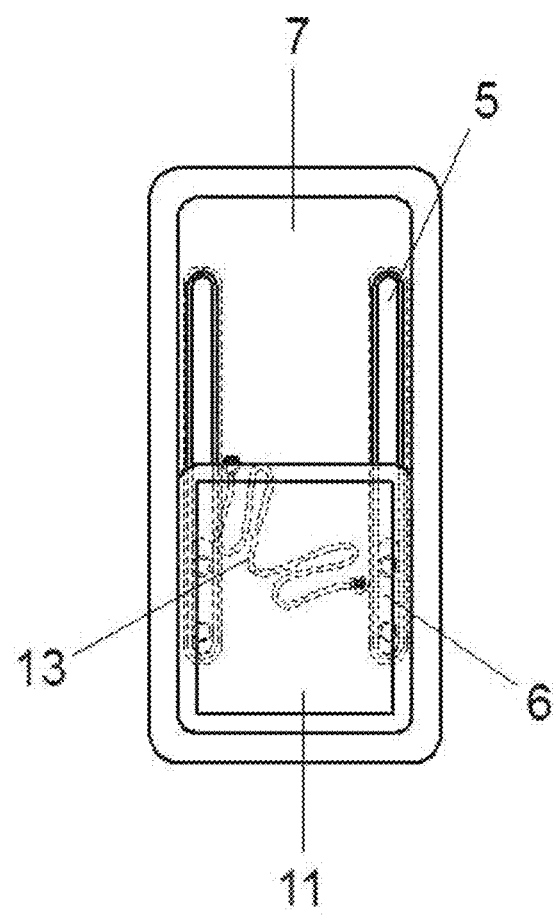
FIG. 3 shows the case in normal status.
Figure 4:
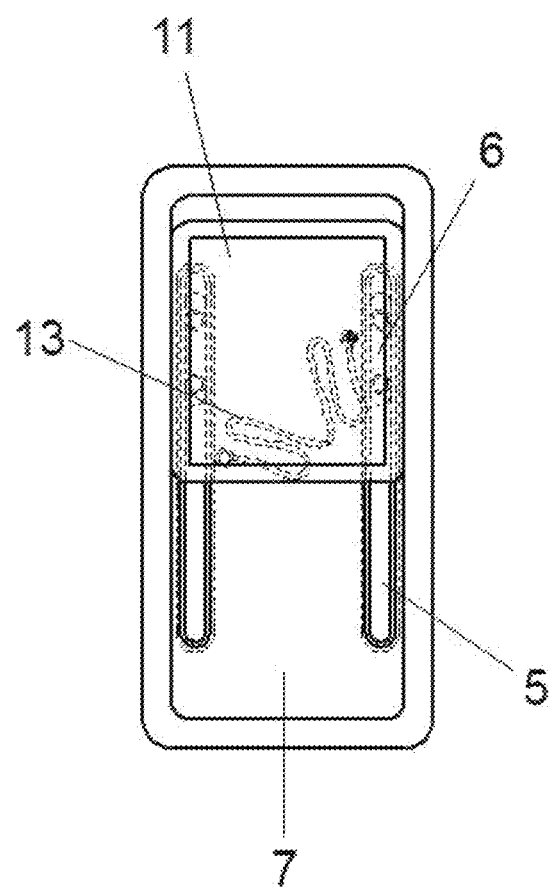
FIG. 4 shows the camera lens becoming exposed to the outside when taking photographs.

The cellular phone case of an embodiment of the present invention comprised of above is characterized by followings;

when opening a cover 19 and pushing a cellular phone 9 or the cellular phone supporting board 10 upward in order to take photographs with a cellular phone, the moving board 11 holding a cellular phone 9 moves upward along with the guide rail 5 of the fixed board 7 as shown in FIG. 3. At this time, the spring 13 of which left end is fixed on the center line of left end of the fixed board 7 and of which right end is fixed and connected on the center line of right end of the moving board 11 gets compressed as the moving board 11 ascends. However, if the middle part of the moving board 11 reaches the center line of the fixed board 7 and gets outside of a critical value, the spring 13 expands to the original condition, while by pushing the moving board 11 upward automatically as shown in FIG. 4, the camera lens 20 of cellular phone 9 becomes exposed outside the cellular phone case as shown in FIG. 1.

After taking photographs, if the user pushes slightly downward on the cellular phone 9 or the cellular phone supporting board 10 in order to return the cellular phone 9 to the inside of the cellular phone case, the spring 13 works and lowers the moving board 11, moving in the opposite direction to the direction when taking photographs above, and returns the cellular phone 9 held in the moving board 11 to the inside of the cellular phone case.

As explained above, the cellular phone case that is an embodiment of the present invention moves the camera lens 20 of the cellular phone 9 upward and enables the user to take photographs by exposing the camera lens 20 outside the cellular phone case.

Conventionally, because the face outside the main body 3 must be held open to secure a view for a camera lens hole formed on the main body 3 of the cellular phone case, the application of a wallet or diary receptacles 17 diversely on the face outside the main body 3 is restricted, but the present invention does not have any restriction on the face outside the main body 3 of the cellular phone case, and diverse types and functions of a wallet or the diary receptacles 17 on the face outside the main body 3 can be combined sufficiently, and the cellular phone case has the merit of sufficiently allowing functions of cellular phone case as well as those of a wallet at the same time.

Figure 5:
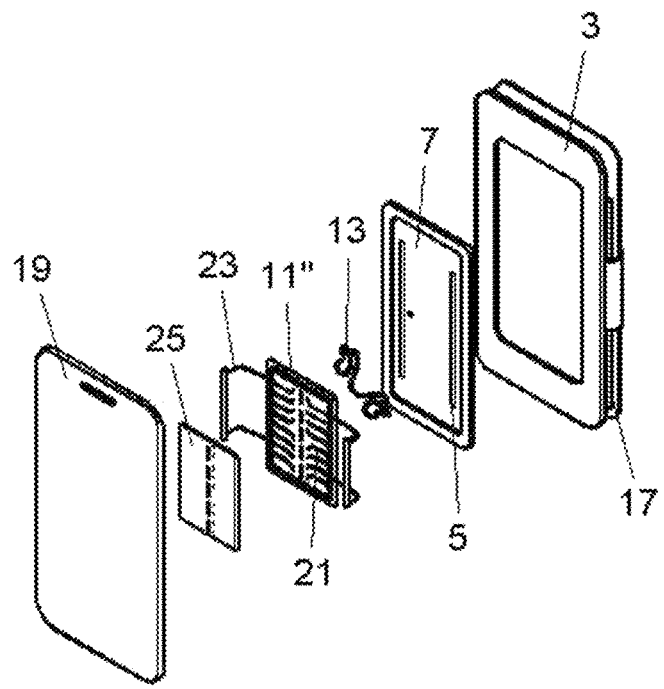
FIG. 5 is an exploded perspective view which shows the construction status of another embodiment according to the present invention.

FIG. 5 is an exploded perspective view of construction status of another embodiment according to the present invention, showing the construction in which many spring inserting grooves 21, registered as Korean Utility Model Registration No. 0450887, are formed on the face inside the moving board 11", in which a cellular phone supporting spring 23 is inserted, and a cover 25 is again covered on the face inside the cellular phone supporting spring 23. This construction enables a cellular phone 9 to be installed while being supported in a soft manner by the elasticity of the cellular phone supporting spring 23.

Figure 6:
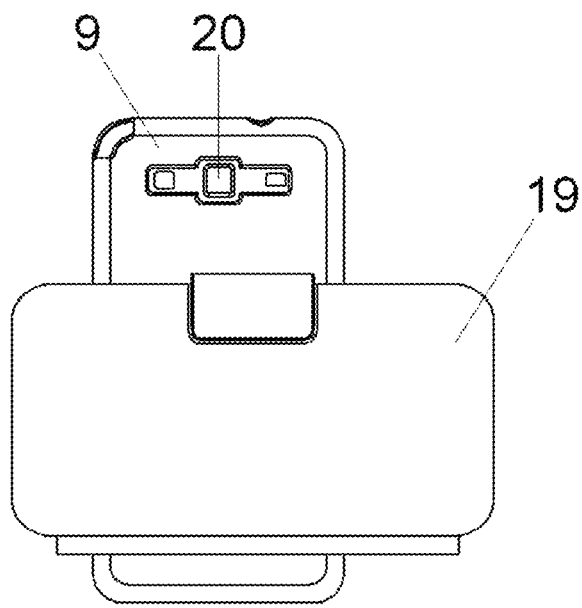
FIG. 6 is an outline perspective view of another embodiment of the cellular phone case according to the present invention, FIG. 7 an exploded perspective view of the same embodiment in FIG. 6, FIG. 8 an outline perspective view of another embodiment of the cellular phone case according to the present invention.
Figure 7:
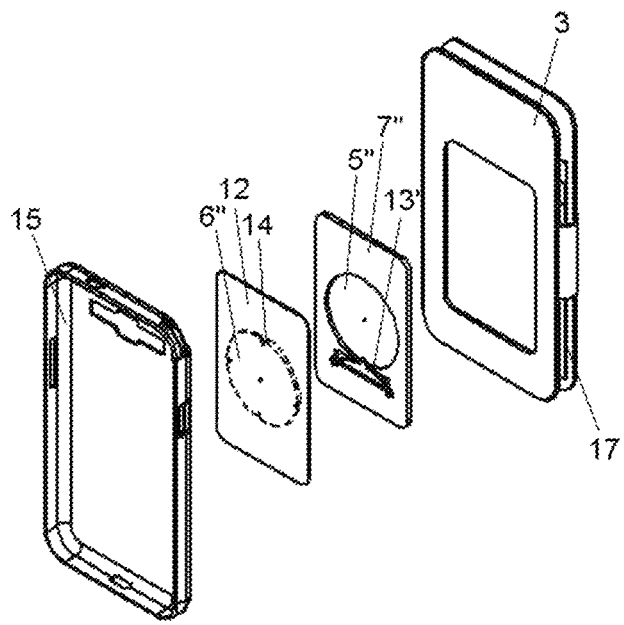

FIG. 6 is an outline perspective view of another embodiment of the cellular phone case according to the present invention. FIG. 7 is an exploded perspective view of the same embodiment in FIG. 6, showing the construction in which: on the face inside the main body 3 of the cellular phone case, the fixed board 7" with a circular guide groove 5" is combined; end part of a plate spring 13' is elastically installed in a projected manner inward the external circumference of the guide groove 5" plate spring 13'; a guider 6" with several stoppers 14 on its external circumference is inserted into the guide groove 5" of the fixed board 7", and a rotation board 12 is installed to enable the rotation around guide groove 5" as an axis; when opening a cover 19 and rotating a cellular phone 9 or the cellular phone supporting board 10 in order to take photographs, while the rotation board 12 holding a cellular phone 9 rotates around the guide groove 5" of the fixed board 7" as an axis, in the condition that the plate spring 13' of the fixed board 7" is elastically installed to the stoppers 14 formed on the guider 6" of the rotation board 12, the camera lens 20 of cellular phone 9 becomes exposed outside the cellular phone case as shown in FIG. 6.

Figure 8:
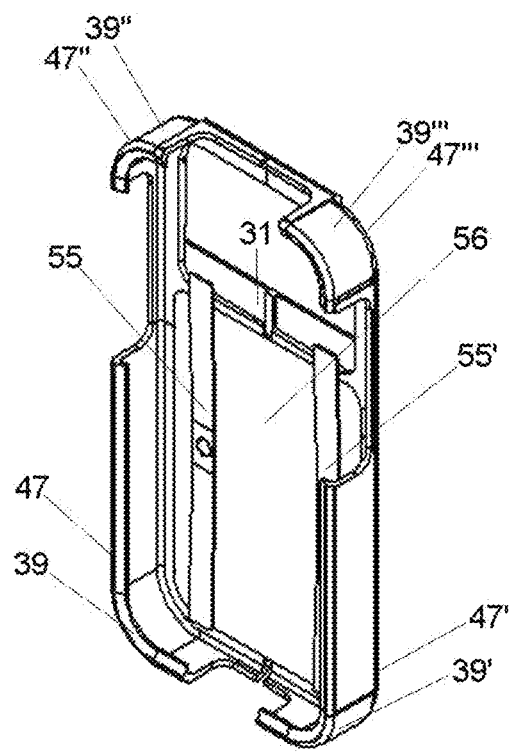
Figure 9:
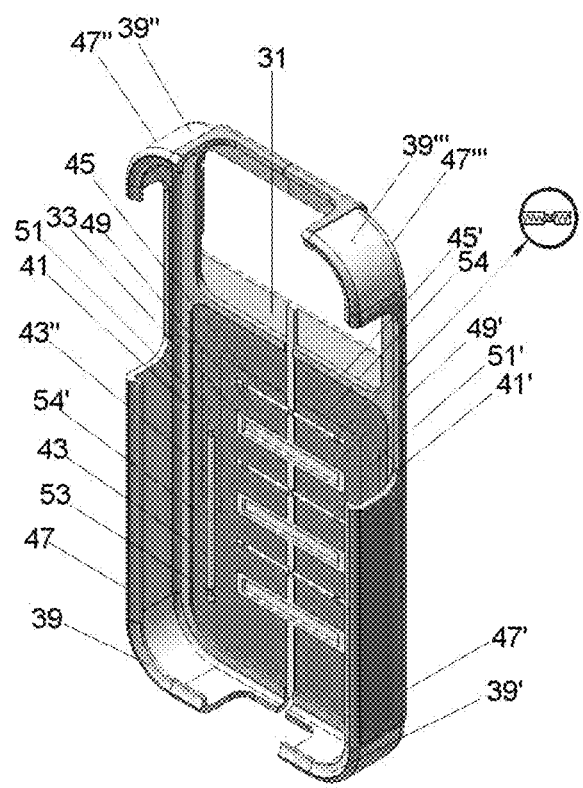
FIG. 9 is a perspective view showing the status in which the protection cover has been removed.
Figure 10:
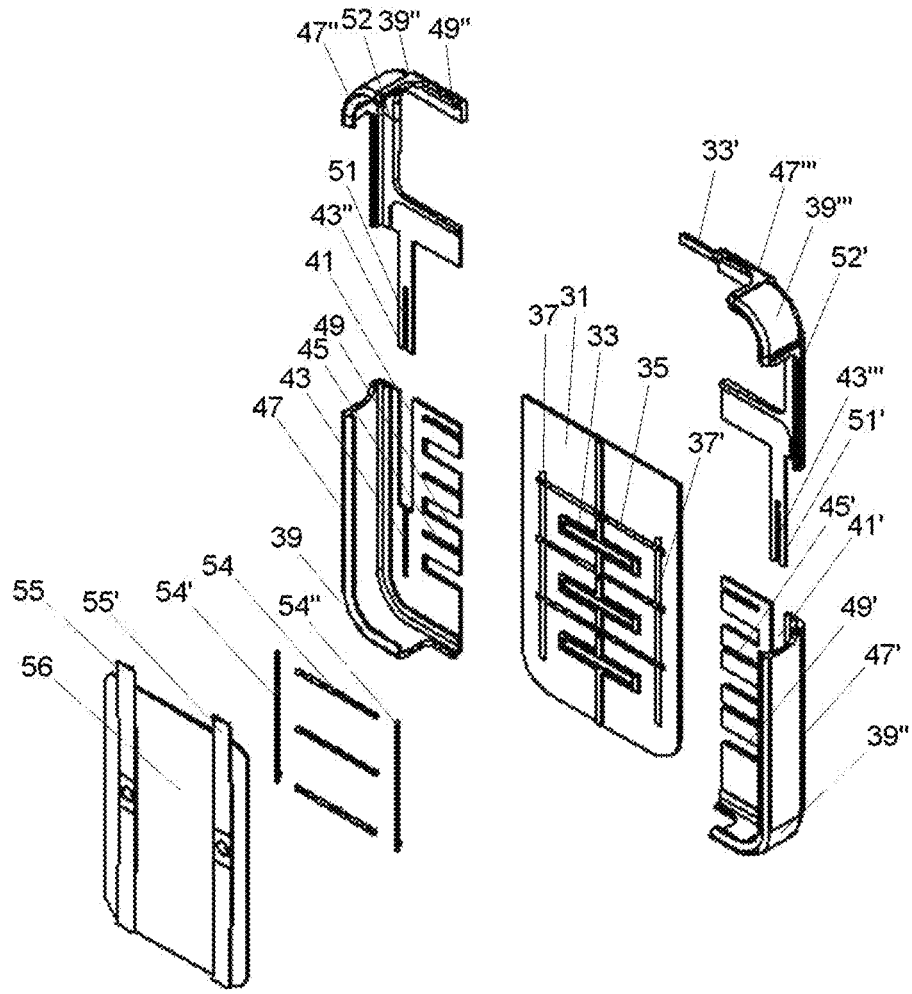
FIG. 10 is an exploded perspective view of the same embodiment in FIG. 9.
Figure 11:
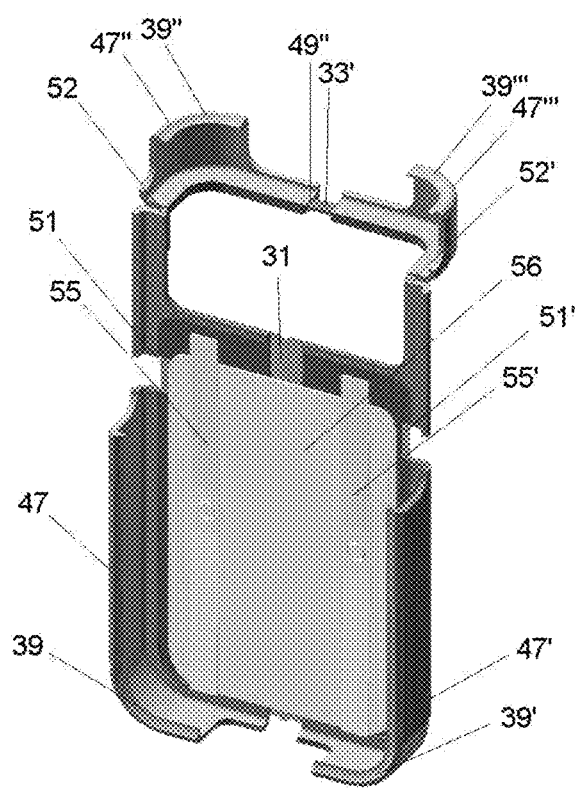
FIG. 11 is a perspective view showing the status in which a cellular phone is being attached to the fixing device, FIG. 12 a perspective view showing the status in which a cellular phone has been attached.
Figure 12:
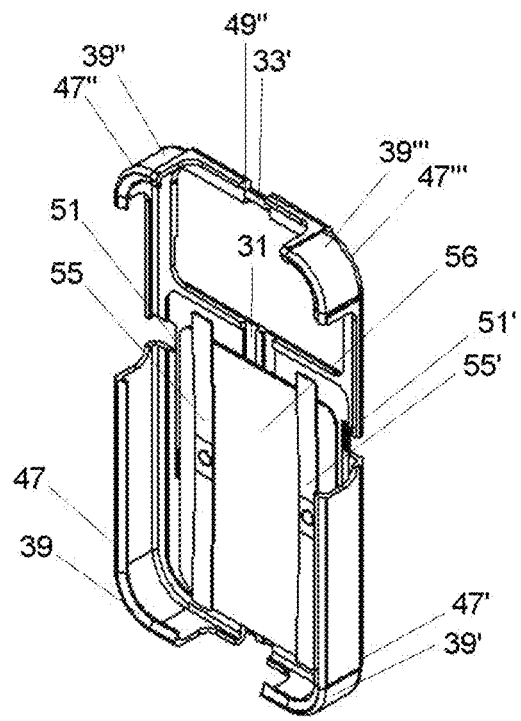

FIG. 8 an outline perspective view of another embodiment of the cellular phone case according to the present invention. FIG. 9 is a perspective view showing the status in which the protection cover has been removed. FIG. 10 is an exploded perspective view of the same embodiment in FIG. 9. FIG. 11 is a perspective view showing the status in which a cellular phone is being attached to the fixing device. FIG. 12 a perspective view showing the status in which a cellular phone has been attached.

The cellular phone case of another embodiment of the present invention is characterized in: that several horizontal guides 33 and horizontal spring inserting grooves 35 are formed in the transverse direction of a cellular phone supporting board 31, and vertical spring inserting grooves 37, 37' are formed in the longitudinal direction of the cellular phone supporting board 31; that the horizontal guide 33 of the cellular phone supporting board 31 is inserted into a horizontal guide groove 49, 49' of the lower cellular phone supporting members 47, 47' which are equipped with cellular phone supporting fixtures 39, 39' on their external ends, and vertical guide grooves 41, 41', vertical spring inserting grooves 43, 43' and horizontal spring inserting grooves 45, 45' on their internal side, respectively; that the horizontal guide 33 of the cellular phone supporting board 31 is inserted into a horizontal guide grooves 49, 49' of the lower cellular phone supporting members 47, 47' which are equipped with cellular phone supporting fixtures 39, 39' on their external ends, and a vertical guide groove 41, 41', vertical spring inserting grooves 43, 43' and horizontal spring inserting grooves 45, 45' on their internal sides, respectively; that into vertical guide grooves 41, 41' of the lower cellular phone supporting members 47, 47' are inserted vertical guides 51, 51' of upper cellular phone supporting members 47", 47''' which are equipped with cellular phone supporting fixtures 39", 39''' on their external ends, and vertical spring inserting grooves 43", 43''' on their internal sides, respectively; that in the upper end part of the cellular phone supporting members 47", 47''', a horizontal guide groove 49" and a horizontal guide 33' are provided; and that on both of left and right sides, bent grooves 52, 52' form so as to bend cellular phone supporting fixtures 39", 39''' externally.

Again, the external ends of the horizontal and vertical spring inserting grooves 45, 45', 43, 43' are provided with a supporting chin 53 to prevent horizontal and vertical spring inserting grooves 45, 45', 43, 43' inserted springs 54, 54', 54" from leaving outside.

And, a protection cover 56 equipped with a plate spring 55, 55' is attached on the front of cellular phone supporting board 31 to which the upper and lower cellular phone supporting members 47", 47''', 47, 47' are assembled. On the other hand, the upper and lower cellular phone supporting members 47", 47''', 47, 47' are made of hard or soft plastic double injection, or cellular phone contact part of cellular phone supporting fixture 39, 39', 39", 39''' is V coated to prevent the cellular phone held inside from flaw or damage.

The cellular phone case of the embodiment or another embodiment of the present invention comprised as above is characterized by followings: when holding a cellular phone, push the upper part of upper cellular phone supporting member 47", 47''' backward, and bend the upper part of upper cellular phone of supporting member 47", 47''' as an axis of bent groove 52, 52'; and then, through the upper part of upper cellular phone supporting member 47", 47''', push a cellular phone into the space between left and right cellular phone supporting fixtures 39, 39'; and then, while along a guide 33 of cellular phone supporting board 31, guide grooves 49, 49' of lower cellular phone supporting member 47, 47' move horizontally in slide, cellular phone supporting fixtures 39, 39' of lower cellular phone supporting members 47, 47' which are elastically attached by a spring 54 closely attaches to fix the cellular phone in the central direction.

At this condition, push the upper part of the upper cellular phone supporting members 47", 47''' forward again and bend the upper part of upper cellular phone supporting members 47", 47''' forward as an axis of bent grooves 52, 52' to return to original condition, while along guide grooves 41, 41' of lower cellular phone supporting members 47, 47', guide 51, 51' of upper cellular phone supporting members 47", 47''' move vertically in slide, cellular phone supporting fixtures 39", 39''' of upper cellular phone supporting members 47", 47''' which are elastically attached by springs 54, 54" closely attach to fix the upper part of cellular phone in the central direction.

Likewise, in the condition that with cellular phone supporting fixtures 39", 39''', 39, 39' of upper and lower cellular phone supporting member 47", 47''', 47, 47', up and down, and left and right of cellular phone is closed attached and stably fixed, plate spring 55, 55' of protection cover 56 closely attaches the rear face of cellular phone, and the cellular phone is closed attached and fixed to upper and lower cellular phone supporting members 47", 47''', 47, 47'.

And, in the event of separating the cellular phone from cellular phone protective case for replacing cellular phone batteries, etc., in a reverse order of holding the cellular phone, turn the upper part of upper cellular phone supporting members 47", 47''' backward, and bend the upper part of upper cellular phone supporting members 47", 47''' backward as an axis of bent grooves 52, 52', and then if pulling out the cellular phone from cellular phone supporting fixtures 39", 39''', 39, 39' of upper and lower cellular phone supporting member 47", 47"', 47, 47', while guides 33, 51, 51' which are closely attached by spring 54, 54', 54" move outside along guide grooves 49, 49', 41, 41' and gap open, cellular phone can be separated from upper and lower cellular phone supporting members 47", 47"', 47, 47'.

After the cellular phone being pulled out, upper and lower cellular phone supporting member 47", 47"', 47, 47' moves inward again by spring 54', 54", 54 to maintain the compressed condition.

Likewise, cellular phone case of one embodiment or another embodiment of the present invention, when holding the cellular phone, is halved in the opposite direction of up, down, left and right, up, down, left and right of cellular phone is closely attached and stably fixed by cellular phone supporting fixture of cellular phone supporting members which are elastically attached by spring, wherein plate spring of protection cover closely attaches the rear face of cellular phone, and the cellular phone is closed attached and fixed to cellular phone supporting members, therefore, by letting be capable of accommodating a wide range of cellular phones which slightly differ in size, thickness, shape and etc., by letting the manufacturers and sellers ease the burden of being equipped with each cellular phone case to meet the size, thickness and shape according to cellular phone models, and reduce the manufacturing cost significantly, and by the consumers who purchase cellular phones be capable of selecting their favorite cellular phone cases without difficulty of having to examine cellular phone cases one by one to ensure they fit the cellular phone type they possess when purchasing cellular phone cases, and, has the merit of always closely sticking to the cellular phone case for stable use of the cellular phone without insisting on the product tolerances.

Figure 13:
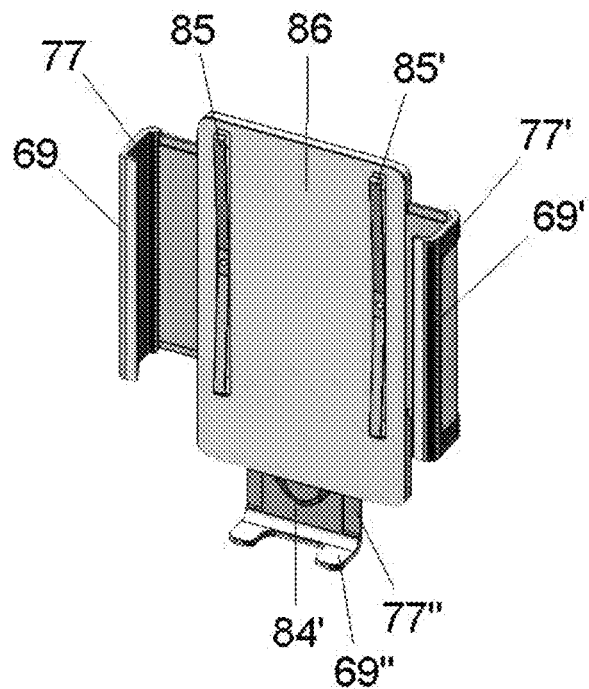
FIG. 13 is an outline perspective view of another embodiment of the cellular phone case according to the present invention.
Figure 14:
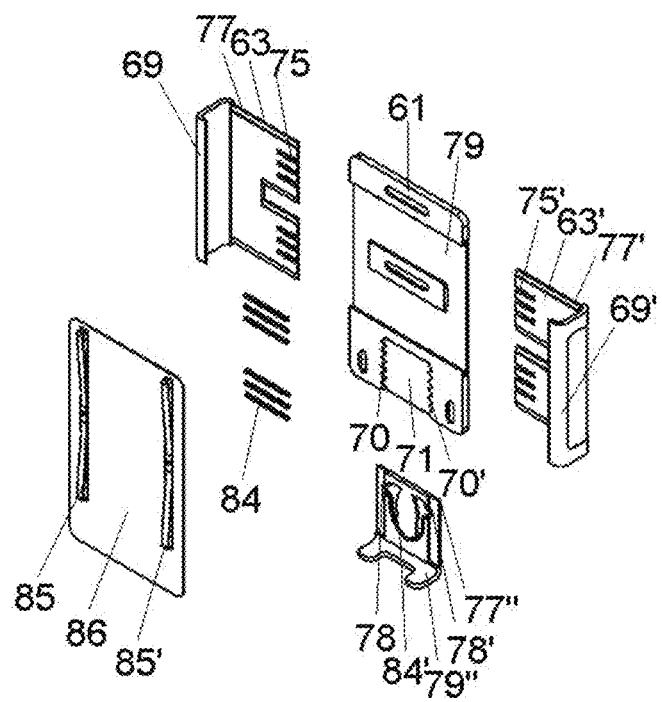
FIG. 14 is an exploded perspective view of the same embodiment in FIG. 13.
Figure 15:
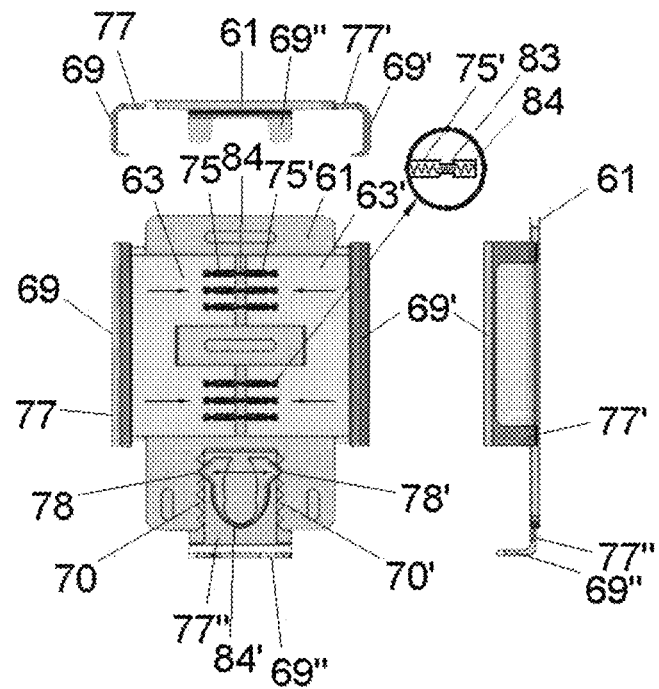
FIG. 15 is a plan view, front view and side view showing the working status of the same embodiment in FIG. 14.
Figure 16:
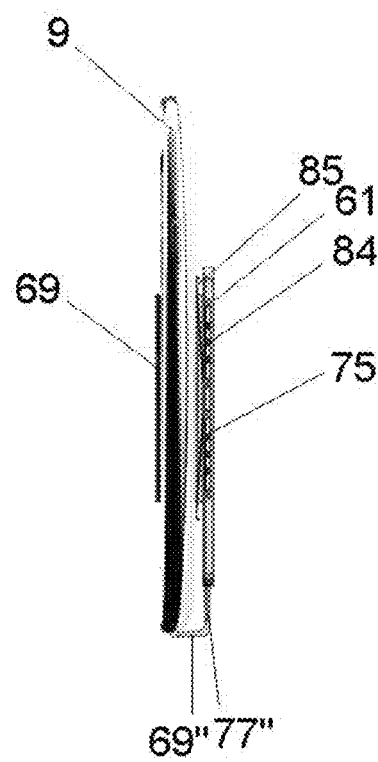
FIG. 16 is a side cross sectional view showing a cellular phone has been attached.
Figure 17:
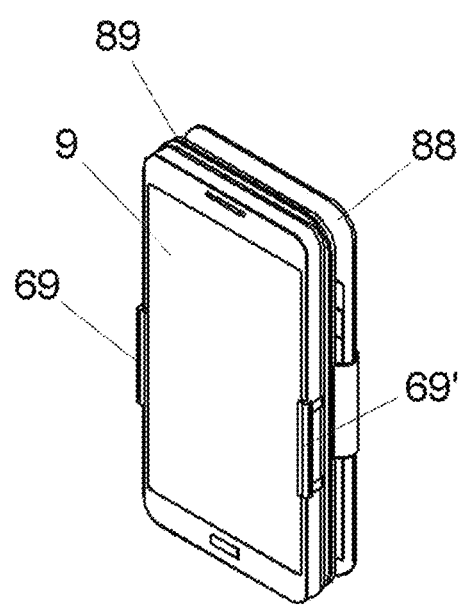
FIG. 17 is a perspective view showing the status in which a cellular phone has been attached to the cellular phone case where the same embodiment in FIG. 13 is applied.

FIG. 13 is an outline perspective view of another embodiment of the cellular phone case according to the present invention. FIG. 14 is an exploded perspective view of the same embodiment in FIG. 13. FIG. 15 is a plan view, front view and side view showing the working status of the same embodiment in FIG. 14. FIG. 16 is a side cross sectional view showing a cellular phone has been attached. FIG. 17 is a perspective view showing the status in which a cellular phone has been attached to the cellular phone case where the same embodiment in FIG. 13 is applied.

By simplifying the fixed part contacting with the cellular phone much more, these enable to secure the much wider space to connect various accessories such as earphone, antenna, battery, etc.; a horizontal guide groove 79 forms in the front face of cellular phone supporting board 61 in a transverse direction; and longitudinally, a vertical guide groove 71 equipped with a series of stoppers 70, 70' forms on both of upper side and lower side, or either of them.

And, into a horizontal guide groove 79 of the cellular phone supporting board 61, are inserted horizontal guides 63, 63' of cellular phone supporting members 77, 77' equipped with cellular phone supporting fixtures 69, 69' on their external end parts, outside of the cellular phone supporting fixtures 69, 69' is UV coated to prevent the contact face of cellular phone held inside from flaw, again, on the face inside the cellular phone supporting members 77, 77', several horizontal spring inserting grooves 75, 75' form with supporting chin 83 being provided at their external end parts, and a spring 84 is inserted and stably attached in their inside.

In addition, cellular phone supporting member 77" equipped with a cellular phone supporting fixture 69" is inserted into vertical guide groove 71 of the cellular phone supporting board 61 on its end part, and on the upper part of cellular phone supporting member 77", is installed a U-type spring 84' with projected chins 78, 78' combined to stoppers 70, 70' of the vertical guide groove 71 on both of left and right ends.

And, on the front face of a cellular phone supporting board 61 in which the cellular phone supporting members 77, 77', 77" are assembled, a protection cover 86 with plate springs 85, 85' is attached, and on the rear face, a lower cover 89 of cellular phone protective case 88 is bonded.

Likewise, cellular phone case of one embodiment or another embodiment of the present invention, when holding a cellular phone, open the upper side cover of cellular phone case 88 and then, through the upper part of a lower cover 89 of a cellular phone protective case 88, push a cellular phone into the space between left and right cellular phone supporting fixtures 69, 69', and then while along a horizontal guide groove 79 of cellular phone supporting board 61, horizontal guide 63, 63' of cellular phone supporting members 77, 77' move horizontally in slide, cellular phone supporting fixtures 69, 69' which are elastically attached by a spring 84 closely attaches to fix the cellular phone in the central direction.

In this status, if the user pushes on a cellular phone supporting member 77" upward, while a cellular phone supporting member 77" ascends along a vertical guide groove 71, the protrusions 78, 78' of U-type spring 84' are engaged with stopper 70, 70' of the vertical guide groove 71 and the lower end part of cellular phone 9 is stably supported to a cellular phone supporting fixture 69".

When separating the cellular phone 9 from a cellular phone protective case 88 in order to replace batteries while using the cellular phone 9, in a reverse order of holding the cellular phone, pull the cellular phone 9 upward and then, while cellular phone supporting fixtures 39, 39' gap open outside along a horizontal guide groove 49 by the elasticity of spring 54, cellular phone 9 can be simply separated from a cellular phone protective case 88.

Although the present invention was explained based on a specified embodiment as above, there can be several changed embodiments within the technical thoughts of the present invention.

As an instance, the composition of fixed board 7, 7", moving board 11, 11", rotation board 12, cellular phone supporting board 10 and spring 13, 13' applied in the one embodiment of the present invention can exert the function of exposing camera lens 20 of cellular phone 9 outside the cellular phone case by other modified embodiment; type and combined status of horizontal guide 33, 33', 63, 63', vertical guide 51, 51', horizontal guide groove 49, 49', 49", 79 vertical guide groove 41, 41', 71 and spring 54, 54', 54", 84 illustrated in the another embodiment can be also properly modified within the technical thoughts of the present invention. The technical scope of the present invention is not confined only within the embodiments.

REFERENCE NUMERALS

3: main body
5: guide rail
5": guide grooves
6, 6": guider
7, 7": fixed board
9: cellular phone
10: cellular phone supporting board
11, 11": moving board
12: rotation board
13: spring
13': plate spring
14: stoppers 17: diary receptacles
19: screen protection cover
20: camera lens
21: spring inserting grooves
23: cellular phone supporting spring
25: cover
31: cellular phone supporting board
33, 33': horizontal guide
35: horizontal spring inserting grooves
37, 37': vertical spring inserting grooves
39, 39', 39", 39'": cellular phone supporting fixtures
41, 41': vertical guide grooves
43, 43', 43", 43'": vertical spring inserting grooves
45, 45': horizontal spring inserting grooves
47, 47': lower cellular phone supporting members
47", 47'": upper cellular phone supporting members
49, 49', 49": horizontal guide groove
51, 51': vertical guides
52, 52': bent grooves
53: supporting chin
54, 54', 54": inserted springs
55, 55': plate spring
56: protection cover
61: cellular phone supporting board
63, 63': horizontal guide
69, 69', 69": cellular phone supporting fixtures
70, 70': stoppers
71: vertical guide grooves
75, 75': horizontal spring inserting grooves
77, 77', 77": cellular phone supporting members
78, 78': protrusions
79: horizontal guide groove
83: supporting chin
84: inserted springs
84': U-type spring
85, 85': plate spring
86: protection cover
88: cellular phone protective case
89: lower cover.

What is claimed is:

1. A cellular phone case with a predetermined receptacle on the face inside the cover of the cellular phone case, comprising:
   a fixed board which forms as an integral part of the main body of the cellular phone case or forms independently to be combined to the main body of the cellular phone case, and a guide rail which forms on the face inside the main body of the cellular phone case,
   a moving board being configured to be slidably mounted on the face inside the fixed board and a guider fixed to the moving board, the guider being configured to move upward and downward along with the guide rail, and on the inside face of the moving board, a cellular phone or a cellular phone supporting board being loaded, and
   a plurality of wallet and diary receptacles being configured to be combined on the face outside the main body.

2. The cellular phone case according to claim 1,
   wherein a spring of which one side end is fixed on the center line of left end part of the fixed board and of which the other side end is fixed on the centerline of right end part of the moving board, respectively, is provided to give the elasticity to the moving board.

3. The cellular phone case according to claim 1,
   wherein the cellular phone supporting board is comprised of hard plastic, jelly type flexible plastic, Velcro tape, or two sides tape.

4. The cellular phone case according to claim 2,
   wherein spring inserting grooves form on the face inside the moving board, in which a cellular phone supporting spring is inserted, and the face inside the cellular phone supporting spring is covered by a cover.

* * * * *